(12) United States Patent
Vegulla et al.

(10) Patent No.: US 11,777,949 B2
(45) Date of Patent: *Oct. 3, 2023

(54) DYNAMIC USER ACCESS CONTROL MANAGEMENT

(71) Applicant: Bank of America Corporation, Charlotte, NC (US)

(72) Inventors: Vijaya Kumar Vegulla, Hyderabad (IN); Netla Hanumantha Reddy, Hyderabad (IN); Sandeep D'souza, Mumbai (IN); Kumar Mahadeva Setty, Newbury Park, CA (US); Anil Kumar Venkata Kalyanam, Hyderabad (IN); Venugopala Rao Randhi, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,161

(22) Filed: Jun. 6, 2022

(65) Prior Publication Data
US 2022/0353271 A1    Nov. 3, 2022

Related U.S. Application Data

(63) Continuation of application No. 16/790,270, filed on Feb. 13, 2020, now Pat. No. 11,394,719.

(51) Int. Cl.
*H04L 9/40* (2022.01)
*G06N 20/00* (2019.01)
*G06N 5/04* (2023.01)

(52) U.S. Cl.
CPC ............ *H04L 63/105* (2013.01); *G06N 5/04* (2013.01); *G06N 20/00* (2019.01); *H04L 63/102* (2013.01)

(58) Field of Classification Search
None
See application file for complete search history.

(56) References Cited

U.S. PATENT DOCUMENTS

| | | |
|---|---|---|
| 3,578,492 A1 | 11/2013 | Reijonen et al. |
| 9,268,962 B1 | 2/2016 | McWhirter |
| 9,281,948 B2 | 3/2016 | Hallin et al. |
| 9,578,036 B2 | 2/2017 | McWhirter |
| 2016/0132690 A1* | 5/2016 | McWhirter ............ G06Q 10/06 726/28 |

* cited by examiner

*Primary Examiner* — Cai Y Chen
(74) *Attorney, Agent, or Firm* — Banner & Witcoff, Ltd.

(57) ABSTRACT

An illustrative computing system for a dynamic user access control management system classifies users and data resources according to their risk and importance by a user management engine with artificial intelligence, machine learning characteristics. The dynamic user access control management system analyzes the log files of data resources to measure system performance characteristics and user access behavior. This system monitors the device and network by which a data access request to a data resource is made. The dynamic user access control management system validates the leave status of a user initiating a data access request. The dynamic user access control management system automatically determines a user access level for a data resource through intelligent analysis of collected information and defers to a user's manager for an access level determination when the determination to grant an access level is outside of the knowledge base of the user management engine.

20 Claims, 17 Drawing Sheets

| Application | Stakeholders | Weight | Description |
|---|---|---|---|
| Application 1 | Legal Team | 50 | Reputation |
| Application 1 | AIT Owner | 10 | Feasability |
| Application 1 | Consumer | 40 | Business |
| Application 2 | Legal Team | 10 | Reputation |
| Application 2 | AIT Owner | 90 | Feasability |

120

| Application | Data | Date | Stakeholders | Exposure Rating |
|---|---|---|---|---|
| Application 1 | DS-1 | 20181231 | Legal Team | 1 |
| Application 1 | DS-1 | 20181231 | AIT Owner | 2 |
| Application 1 | DS-1 | 20181231 | Consumer | 3 |
| Application 2 | DS-1 | 20181231 | Legal Team | 1 |
| Application 2 | DS-1 | 20181231 | AIT Owner | 1 |

124

| Legend | |
|---|---|
| Aggregate Rating | Data Set Type |
| Less than or equal to 1 | Secure |
| Greater than 1 and less than or equal to 2 | Private |
| Greater than 2 | Public |

128

| Formulas | |
|---|---|
| Exposure Rating | Range: 1 - 3 based on stakeholder assessed data exposure |
| Aggregate Rating | ((Rating1*Weight+Rating2*Weight+...+RatingN*Weight)*N/100)/N |

132

| Application | Aggregate Rating | Data Set Type |
|---|---|---|
| Application 1 | 1.9 | Private |
| Application 2 | 1 | Secure |

| Date | User ID | Violation Severity Rating | Violation Description |
|---|---|---|---|
| 3/1/2019 | UID1 | 2 | Unauthorized user logged in to NPI data server |
| 3/2/2019 | UID2 | 2 | Unauthorized user logged in to NPI data server |
| 3/3/2019 | UID3 | 1 | User tried to login to non-assigned servier |
| 3/4/2019 | UID1 | 3 | User copied unauthorized data to media store |
| 3/5/2019 | UID5 | 3 | User copied unauthorized data to media store |

220

| Violation Severity Rating | |
|---|---|
| 1 | Low |
| 2 | Medium |
| 3 | High |

224

| Risk Score Calculation |
|---|
| 1) Determine highest severity violation rating for a user in the most recent quarter |
| 2) Take the average of the highest severity violation ratings in the most recent quarters |
| 3) Take the highest value of step 1 or 2 as the risk score |

228

| User ID | Risk Score | Risk Rank |
|---|---|---|
| UID 1 | 3 | 1 |
| UID 2 | 2 | 2 |
| UID 3 | 1 | 3 |

| Decision Scenarios | | | | |
|---|---|---|---|---|
| User ID | Risk Score | Data Set Type | Access Decision | Manager Access Decision |
| UID 1 | 1 | Secure | Access Granted | - |
| UID 2 | 2 | Secure | Referred to Manager | Access Granted |
| UID 3 | 3 | Secure | Referred to Manager | Access Denied |
| UID 4 | 2 | Secure | Access Granted | - |
| UID 5 | 2 | Secure | Access Granted | Access Denied (Manager Override) |

| Group Configuration | | |
|---|---|---|
| Groups | Resource Type | Resource Name |
| GP 1 | Server | Wrdna1234 |
| GP 1 | Server | Wrdna4321 |
| GP 1 | Shared Folder | \\__nnnn__\Folder1 |
| GP 2 | Server | Wrdna1234 |
| GP 2 | Shared Folder | \\__nnnn__\Folder1 |

742

| User Configuration | |
|---|---|
| User ID | Groups |
| UID 1 | GP 1 |
| UID 2 | GP 2 |
| UID 3 | GP 2 |

744

| Log Entries | | |
|---|---|---|
| Date | User ID | Resource Name |
| 1/23/2018 | UID 1 | Resource1234 |
| 1/30/2018 | UID 2 | Resource1234 |
| 2/21/2018 | UID 3 | \\__nnnn__\Folder1 |
| 2/21/2018 | UID 3 | Resource1234 |
| 2/22/2018 | UID 3 | Resource4321 |
| 2/5/2018 | UID 2 | \\__nnnn__\Folder1 |
| 1/2/2019 | UID 1 | \\__nnnn__\Folder1 |
| 1/15/2019 | UID 2 | Resource4321 |
| 3/29/2019 | UID 3 | Resource4321 |
| 3/29/2019 | UID 4 | \\__nnnn__\Folder1 |
| 3/30/2019 | UID 5 | \\__nnnn__\Folder1 |

746

| User ID | Current Groups | Proposed Groups |
|---|---|---|
| UID 1 | GP 1 | GP 2 |
| UID 2 | GP 2 | GP 1 |
| UID 3 | GP 2 | GP 3 (New Group) |
| UID 4 | New User | GP 3 (New Group) |
| UID 5 | New User | Rejected |

FIG. 7B

DYNAMIC USER ACCESS CONTROL MANAGEMENT

BACKGROUND

Aspects of the disclosure relate to management of access to various data resources. One or more aspects of the disclosure relate to an engine containing an artificial intelligence computing system providing automated access management to data resources for a single user and a group of users.

To access a data resource, a user often requires approval from a manager or administrator. In some cases, approval for the user may need to flow through several individuals. In some cases, periodic reapproval for data access for a user requires a similar number of steps. This process can be time consuming and can often result with a user lacking a necessary level of access to data and applications. As a result, automated user management applications offer limited functionality. As such, user management often requires significant human intervention. Current access management methods lack abilities to dynamically, and automatically, grant, revoke, and manage access to a data resource for users or groups of users. As such, a need has been recognized for a dynamic user access control management system that may automatically manage access to data resources with minimal human intervention.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure provide effective, efficient, scalable, and convenient technical solutions that address and overcome the technical problems associated with accurately and promptly managing access to data resources.

A dynamic user access control management system may automatically manage user access rights based on a classification of data resources accessed by users and/or system access communications by users. To dynamically manage user access to data, a data resource may be classified, such as by an artificial intelligence based classification engine based on an exposure rating and a weight metric associated with the data resource. Accordingly, user data access activities, when attempting to access a data resource, may be classified based on a data access history and the requirements of their employment position. In some cases, one or more data resource classifications and/or user classification information may be stored in a central data store for use in future data analysis of user data access activities and/or data resource classifications. To avoid performing an excessive number of individual access determinations, user data access patterns may be determined. In some cases, one or more log files corresponding to a data resource may be analyzed by a user management engine. These log files may contain information associated with users' access of the data resource, a frequency at which the data resource is accessed, and users, who have access, but infrequently or fail to access the data resource. Using at least these data access metrics, a dynamic user access control management system may intelligently generate user access groups based on collective data resource access patterns.

In an illustrative example, a data classification and/or user classification may be analyzed based on an attempt to access the data resource by a user. In some cases, a network connection and/or a device used when attempting access to the data resource may be monitored. In some cases, stored information associated with a user's leave status (e.g., user calendar information, automatically generated out of office messages, and the like) may be analyzed to identify and/or modify user access rights to one or more data resources. Additionally, the dynamic user access control management system may generate server performance data metrics based on the log files of the data store containing the data resource. Through analysis of the server performance data metrics, the dynamic user access control management system may automatically determine, such as through use of machine learning and/or artificial intelligence based analysis, an access level for each user for use when the user attempts access to one or more data resources, thus removing or at least minimizing a need for manual intervention. In some cases, the dynamic user access control management system may process system information, user data access information and the like to automatically terminate a user's, or group of users', connection(s) to a data resource. The data used in the automatic access level determination may include the user classification, the data classification, and one or more server performance data metrics and user access metrics. The one or more server performance data metrics may include central processing unit (CPU) usage, random access memory (RAM) usage, processing times, and number of user connections. The one or more user access metrics may include an indication of users who access a data resource, the computing network by which a user device accesses the data resource, a frequency and time at which the data resource is accessed, and users, who have access, but infrequently or fail to access the data resource. In some cases, the automatically generated user access level may include one or more of full user access rights to the data resource, read access to the data resource, read and write access to the data resource, an automatically generated notification message requesting entry of a manually selected access level to the data resource, a temporary hold on access to data resources, and/or denied access to the data resource. The dynamic user access control management system may monitor communications for a user access rights determination message received from a network device (e.g., user access rights message from an administrator, a default user rights assignment message from a data resource, and the like) and may incorporate information from such messages into an artificial intelligence knowledge base for future automatic access determinations. In some cases, the knowledge base may include one or more artificial intelligence algorithms and/or machine learning algorithms. In some cases, the automatic access level may be manually overridden by a manager and/or administrator.

These features, along with many others, are discussed in greater detail below.

BRIEF DESCRIPTION OF THE DRAWINGS

The present disclosure is illustrated by way of example and not limited in the accompanying figures in which like reference numerals indicated similar elements in which:

FIG. 1B shows illustrative data resource classification tables in which various aspects of the disclosure may be implemented in accordance with one or more aspects described herein;

FIG. 2B shows illustrative user classification tables in which various aspects of the disclosure may be implemented in accordance with one or more aspects described herein;

FIG. 4B shows an illustrative decision scenario table where access to data resources is determined for users in accordance with one or more aspects described herein;

FIG. 7B shows illustrative tables for determining groups of common users in accordance with one or more aspects described herein;

DETAILED DESCRIPTION

Figure 1A:
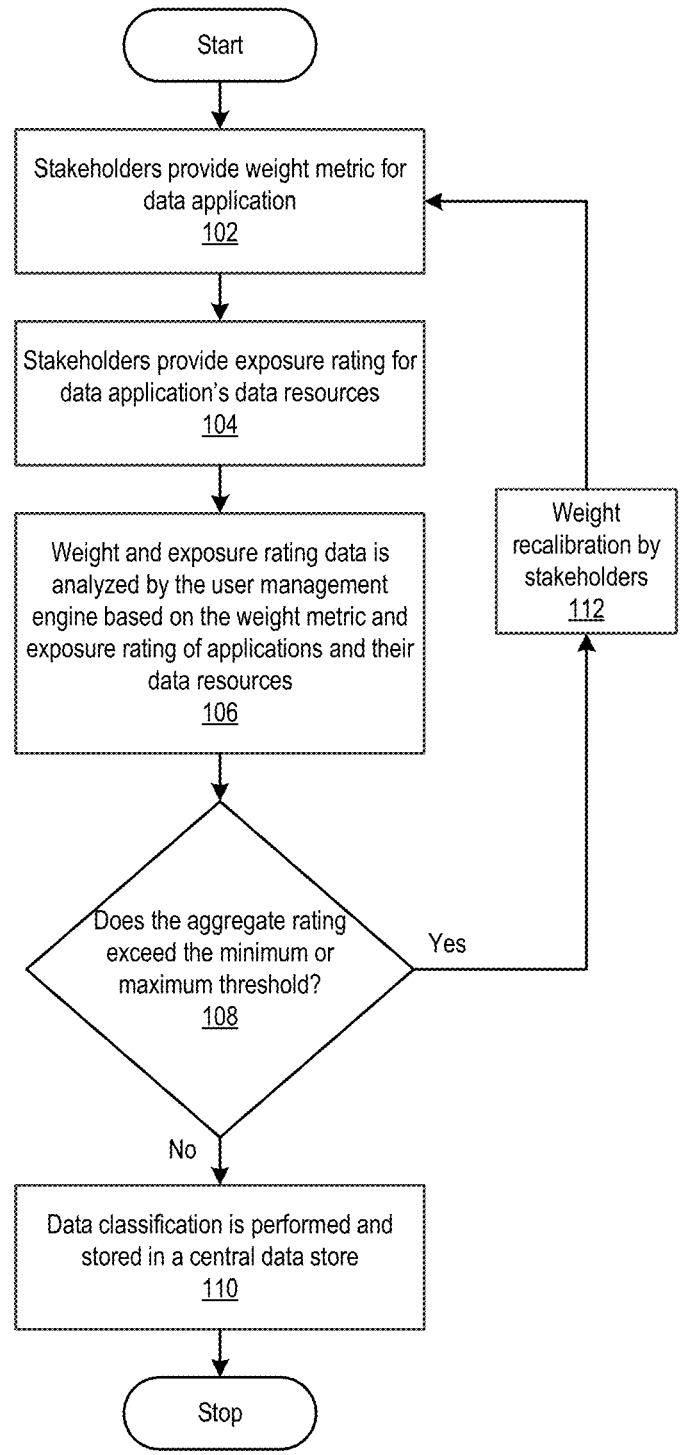
FIG. 1A depicts an illustrative event sequence for classification of a data resource in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the present disclosure.

Aspects described herein are directed to developing a comprehensive dynamic user access management system that may intelligently grant, revoke, and manage access for users to various data resources. Existing user access management systems include time consuming access approval systems, which may provide a significant time delay in granting access to a user who requires it. Some existing systems even require reapproval for certain data resources to protect from unauthorized data breaches, which may further increase the time delay between a data access request and granting access to the user. Further, existing systems and/or methods lack the ability to intelligently manage access to data resources based on user and data classifications and characteristics of a user's access to a data resource.

In some cases, a data resource may be classified to quantify an importance of the data to each stakeholder and define the stakeholders that control the data. For example, data resource classification may occur by a dynamic engine within a broader user management engine, where data resource classification is determined from assigned exposure ratings and weight metrics given to a specific data resource. The user management engine may have one or more artificial intelligence and machine learning characteristics. These characteristics may include artificial intelligence and/or machine learning based algorithms contained in an artificial intelligence machine learning (AI-ML) module. In some cases, data resource exposure ratings may be automatically determined and/or based on information input into the system such as by one or more of the data resource's stakeholders. After classifying a data resource, the data resource classification may be stored in a central data store for future decision making in regards to access to the data resource. In some cases, a user's access of one or more data resources in a computing system may be classified by a dynamic engine. For example, user access classifications may be performed by the intelligent dynamic engine, where the user access classification is based, at least in part, on historical information associated with the user's data access of one or more system resources. In some cases, the dynamic engine within the user management engine may analyze each user's data access history, which may include the history of a user's data violations. After classifying a user according to their data access history, the user classification may be stored in a central data store for future decision making in regards to data access classifications for that user. In some cases, the user access classification may be periodically and/or automatically updated based on changes in a user's data access history.

In some cases, the user management engine may monitor the log files of a data resource by a monitoring engine. The user management engine may generate system performance metrics associated with each data resource based on data from the log files associated with the data resource. The performance data for the data store may include central processing unit (CPU) usage, random access memory (RAM) usage, processing times, and/or a critical time of operation for the data store for specific operating circumstances. In some cases, the user management engine may determine performance data thresholds for the data store containing a data resource. In some cases, the dynamic engine may monitor user communication information history stored in the log files associated with a plurality of data resources to determine data access patterns for users. In some cases, the monitoring engine may monitor network communications, network access information, data communication metrics, and/or data use metrics to determine one or more data access patterns for users.

From the data access patterns, the dynamic engine and AI-ML module may intelligently generate lists of users who commonly access data resources, users who most frequently access resources, and users who have access to data resources but fail to make use of their access to the data resources. The AI-ML module may automatically generate blanket data access groups based on the users' monitored data access patterns and behaviors. A blanket data access group may comprise one or more users, where each user is granted the same access level to one or more of the same data resources. The dynamic engine and notification engine may communicate information corresponding to the blanket data access groups of users for display on a user device (e.g., a user device associated with a manager and/or administrator of the users). Based on the blanket data access groups, the manager and/or administrator may provide input for use by the AI-ML module to enable data access according to the automatically generated blanket data access groups. In some cases, upon a data access request by a user, the dynamic engine may execute multiple verification processes based on information received from other elements of the user management engine.

In some cases, the user management engine may analyze the data access request to determine the device and network used to initiate the data access request. Based on the device type and network type, the AI-ML module may trigger the dynamic engine to automatically grant or deny a user access to the data resource. For example, the AI-ML module may monitor network communications to determine a device type and/or a network type used to communicate each data access request analyzed by the monitoring engine. Based on the monitored device type and network type, at least in part, the artificial AI-ML module may automatically grant or deny access to a data resource. For example, an office computing device attempting to access a data resource over an office secure computing network may be automatically granted access to the data resource, while an office computing device attempting to access the same data resource over a non-office public network may be automatically denied access. In some cases, if the determination to grant or deny access to the data resource is outside of the knowledge base of the AI-ML module, the AI-ML module may trigger the dynamic engine to place a temporary access hold on the access rights of the user attempting to access a data resource. This temporary access hold may be for the specific data resource the user was attempting to access and/or other data access rights for the user. While the temporary access hold for the data resource is in place, a notification engine may communicate an indication of the access hold for the user to a user device (e.g., a computing device associated with the user's manager and/or a system administrator's computing device), such as to solicit an input to continue the access hold or release the access hold. Information corresponding to the temporary access holds, such as the initiation of an access hold, a continuation of an access hold, and/or the release of an access hold may be stored in a historical data store for future processing by the AI-ML module. In some cases, an access determination of the dynamic engine may be overridden based on analysis of information received by the AI-ML module to grant or deny access to the user.

In some cases, the monitoring engine may monitor the user activity information (e.g., an electronically stored calendar) to determine whether a user is expected to be active on the enterprise network, such as by determining a user's leave status. In an illustrative example, the monitoring engine may monitor the user's calendar at predetermined time intervals including hourly and daily intervals. A change in the user's leave status based on the information contained in the user's calendar may trigger the dynamic engine to determine an access level of the user to data resources based on a change in user leave status. The user's calendar may indicate that the user is on leave for a variety of reasons (e.g. vacation, planned leave, unplanned leave, termination, paid leave, unpaid leave, suspension). Based on the calendar entry and upon a data access request, the dynamic engine may automatically grant or deny access. For example, if a user enters a vacation period in their user calendar, they may be automatically denied access to data resources to which they typically have access, due to the user leave status in the user calendar. In some cases, the user may receive pre-approval for access to a data resource while their calendar may define the user to be on leave. In some cases, pre-approval may be generated by the AI-ML module based on an analysis of user access history and/or additional user input (e.g., an input received from a manager's computing device). If the user received pre-approval for access, the AI-ML module and dynamic engine may allow access to the user for the pre-approved data resource.

In some cases, a migrated user may be automatically granted access to a data resource based on the requirements of their employment position. In some cases, upon a data access request by a user, the dynamic engine may monitor the generated performance data for the data store containing the data resource. If a defined system performance threshold is exceeded and/or a critical time is met for the data store, the dynamic engine may automatically deny access to the user and/or terminate access for users accessing the data resource. For example, if server performance threshold of a data resource for central processing unit (CPU) usage is defined at a percentage of CPU use (e.g., 70 percent, 80 percent, 90 percent, and the like), when the threshold is exceeded and/or met, the dynamic engine may terminate the connection of one or more users accessing a data resource and/or deny access to users attempting to access the data resource until the CPU usage falls below the threshold. In some cases, an administrator may define a user connection threshold for a data store containing a data resource. In some cases, the dynamic engine may determine a user connection threshold, or other performance threshold, based on an analysis of historical system performance information. If a user connection threshold for a data store is exceeded and/or met, the dynamic engine may automatically deny access to a user attempting to access the data store. Users may be granted preapproval to override the defined server performance thresholds, critical times, and user connection thresholds for access to particular data resources.

These and various other arrangements will be discussed more fully below.

FIG. 1A depicts an illustrative event sequence for classification of a data resource in accordance with one or more aspects described herein. The events shown in the illustrative event sequence are merely one illustrative sequence and additional events may be added, or events may be omitted, without departing from the disclosure. Inputs and outputs represented illustrative sequence may be associated with sources and destinations not depicted in the figures. Here, the data classification event sequence may begin with the stakeholders inputting a weighted metric for a data application 102. This weighted metric may be a numerical percentage ranging from 0 percent to 100 percent that classifies a data application based on the particular stakeholder's control over the data application in comparison to other stakeholders. The sum of the weights for a data application assigned by each stakeholder for the data application may amount to 100 percent. For example, a stakeholder with minimal control over a data application may assign a weight metric of 10 percent, while a stake holder with a majority control in the data application may assign a weight metric of more than 50 percent. At 104, the stakeholders may provide a numerical exposure rating to the data resources contained within the data application. The numerical exposure rating may be based from the numerical values of 1 to 3, where an exposure rating of 1 may represent a data resource of highest importance to a stakeholder and an exposure rating of 3 may represent a data resource of lowest important to a stakeholder. Upon the assignment of a weight metric and an exposure rating to a data application and the data application's data resources, the assigned weight metrics and exposure ratings may be analyzed by the user management engine, based on an aggregate rating formula to determine a standardized aggregate rating 106 for a data resource. The aggregate rating may range from 1 to 3, where varying thresholds may determine the data set type (e.g. secure, private, or public). After analysis to determine an aggregate rating, the aggregate rating may undergo verification to ensure the aggregate rating is within the minimum and maximum threshold 108. If the aggregate rating breaches the minimum or maximum threshold, the weight metrics may be recalibrated by the stakeholders to sum to 100 percent. After recalibration of weight metrics 112, the event sequence may reset at 102. If the aggregate rating does not exceed the minimum or maximum threshold, at 110, the data application may be classified under a secure, private, or public data set type and the resulting data classification may be stored in a central data base for future access determinations. One or more different data set types for varying classification levels may be introduced without departing from the present disclosure. Data classification may reoccur periodically at defined intervals of time to update the data classification to reflect changes in stakeholders in control of a data resource and the importance of a data resource to the stakeholders.

FIG. 1B shows illustrative data resource classification tables in which various aspects of the disclosure may be implemented in accordance with one or more aspects described herein. Table 120 depicts an example of a chart that may show the data application that is subject to classification by a user management engine, the input provided by the stakeholder for each application, the corresponding weight metric assigned by the stakeholder group, and a description assigned by the stakeholder. Table 124 depicts an illustrative chart that may show the data application that is subject to classification by the user management engine, the data resource that is being assigned an exposure rating, the date, the stakeholder for each application, and the corresponding exposure rating assigned by the stakeholder group. Table 128 depicts an illustrative legend chart that details the data set type that corresponds to a specific aggregate rating. Table 132 depicts an illustrative formula chart that details the exposure rating range and the formula for calculating the aggregate rating for a data application or a specific data resource.

Table 136 depicts an example of a chart detailing the data application that is subject to classification by the user management engine, the corresponding aggregate rating, and the data set type associated with the aggregate rating. For example, Application 1 may be classified by the user management engine. The stakeholders (Legal Team, AIT Owner, Consumer) may each input a weighted metric for Application 1 (50, 10, and 40). The stakeholders may provide an exposure rating to a data resource (DS-1) within Application 1. In this example, Legal Team provides an exposure rating of 1, AIT Owner provides an exposure rating of 2, and Consumer provides an exposure rating of 3, numerically defining the importance of the data resource DS-1 to each stakeholder group. Once the user management engine collects the weighted metric and exposure rating data for Application 1 and the data resource DS-1, the elements within the user management engine (e.g. AI-ML module, and/or dynamic engine) may proceed by analyzing the data and determining an aggregate rating. Based on 3 total stakeholders and the stakeholder provided weighted metrics and exposure ratings, the aggregate rating is determined to be 1.9. According to the data set type legend of this example, an aggregate rating of 1.9 yields a data set type of Private for DS-1 within Application 1.

Figure 2A:
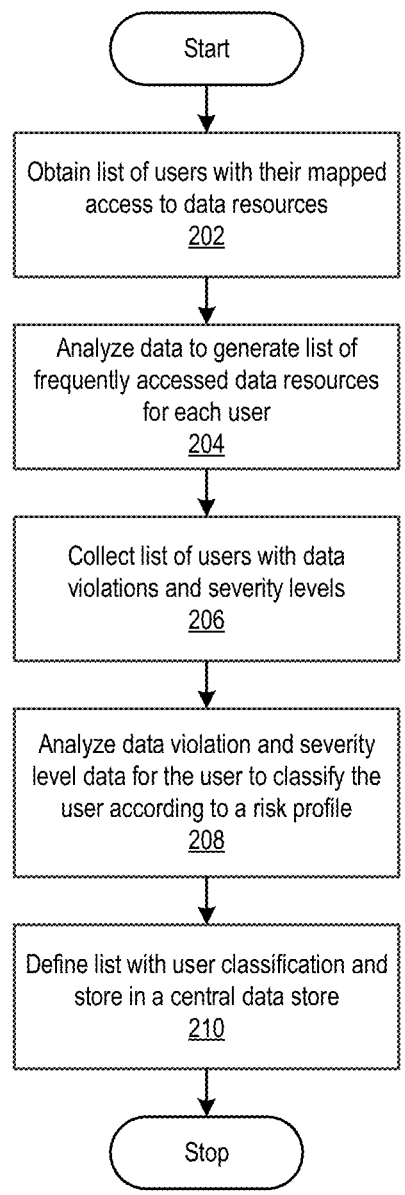
FIG. 2A depicts an illustrative event sequence for classification of a user in accordance with one or more aspects described herein.

FIG. 2A depicts an illustrative event sequence for classification of a user in accordance with one or more aspects described herein. The events shown in the illustrative event sequence are merely one illustrative sequence and additional events may be added, or events may be omitted, without departing from the disclosure. Inputs and outputs represented illustrative sequence may be associated with sources and destinations not depicted in the figures. Referring to FIG. 2A, a user classification event sequence may begin by obtaining a list of active users and their corresponding mapped access to data resources 202. This list may be generated by auditing and/or analyzing the log files of each data resource stored on the network and/or by alternative data gathering methods (e.g., monitoring network communications). At 204, the list may be analyzed to generate a separate list of frequently accessed data resources for each user. At 206, a list may be generated that contains data violations and the corresponding violation severity levels for the user undergoing classification. Example data violations from low severity to high severity may include attempted access to a nonauthorized data resource, accessing a nonauthorized data resource, and copying and/or transmitting unauthorized data to a storage device and/or domain, with severity of a data violation also depending on the importance of the data resource involved in the violation. For example, attempting to access a nonauthorized data resource may be assigned a low severity data violation level for low importance data. However, attempting to access a nonauthorized data resource may be classified as a high severity data violation if the data resource was defined as very important (e.g. highly sensitive data). The AI-ML module may analyze the context of a data violation, including the type of data violation and the data resource that was included in the data violation to determine a severity rating for the data violation. This list may include data violations only for a specified time period (e.g., a recent quarter, the last year, all time, and the like) as defined by the dynamic engine and/or for the user's entire access history. At 208, the data violation and severity level data may be analyzed to generate a risk score and/or risk rank in comparison to other users. A risk rank and/or risk score may correspond to a defined access level for a user, based on analysis of the risk rank and/or risk score within the AI-ML module. For example, a user with a risk score indicating a high level of risk may automatically limited to read access or no access to certain data resources by the AI-ML module and dynamic engine contained in the user management engine, while a user with a risk score indicating a low level of risk may be automatically granted full access by the AI-ML module and dynamic engine to the same data resources, independent of other contributing factors to determining a user's access to a data resource. At 210, the risk score and/or risk rank may be compiled with a user's frequently accessed data resources to form a user classification and may be stored in a central data store for future access determinations. The user classification may be periodically updated based on changes in a user's risk score, risk ranking, frequently accessed data resources, and/or any change in the user's data access history.

FIG. 2B shows illustrative user classification tables in which various aspects of the disclosure may be implemented in accordance with one or more aspects described herein. Table 220 depicts an illustrative chart detailing the date of a data violation, the corresponding identifier (ID) of the user who committed the data violation, the severity of the data violation, and the description of the data violation. Table 224 depicts an example legend chart that defines a numerical severity level with a corresponding severity identifier. For example, a severity rating of 2 may correspond to a medium severity data violation. In some cases, one or more different severity rating and classification methods may be used without departing from the present disclosure.

Table 228 depicts an illustrative procedure for calculation of a risk score corresponding to a user. As shown, a risk score may be determined by taking the highest severity violation rating for the most recent quarter of a user's data access history or the average of the highest severity violation ratings for the most recent quarters of a user's data access history. For example, data violations from low to high severity may include attempted access to a nonauthorized data resource (e.g. violation severity rating of 1), accessing a nonauthorized data resource (e.g. violation severity rating of 2), and copying and/or transmitting unauthorized data to an unauthorized storage device and/or domain (e.g. violation severity rating of 3), with the severity of a data violation also depending on the importance of the data of concern in the violation. Table 232 depicts a user ID with the corresponding calculated risk score and risk rank in comparison to other users.

Figure 3:
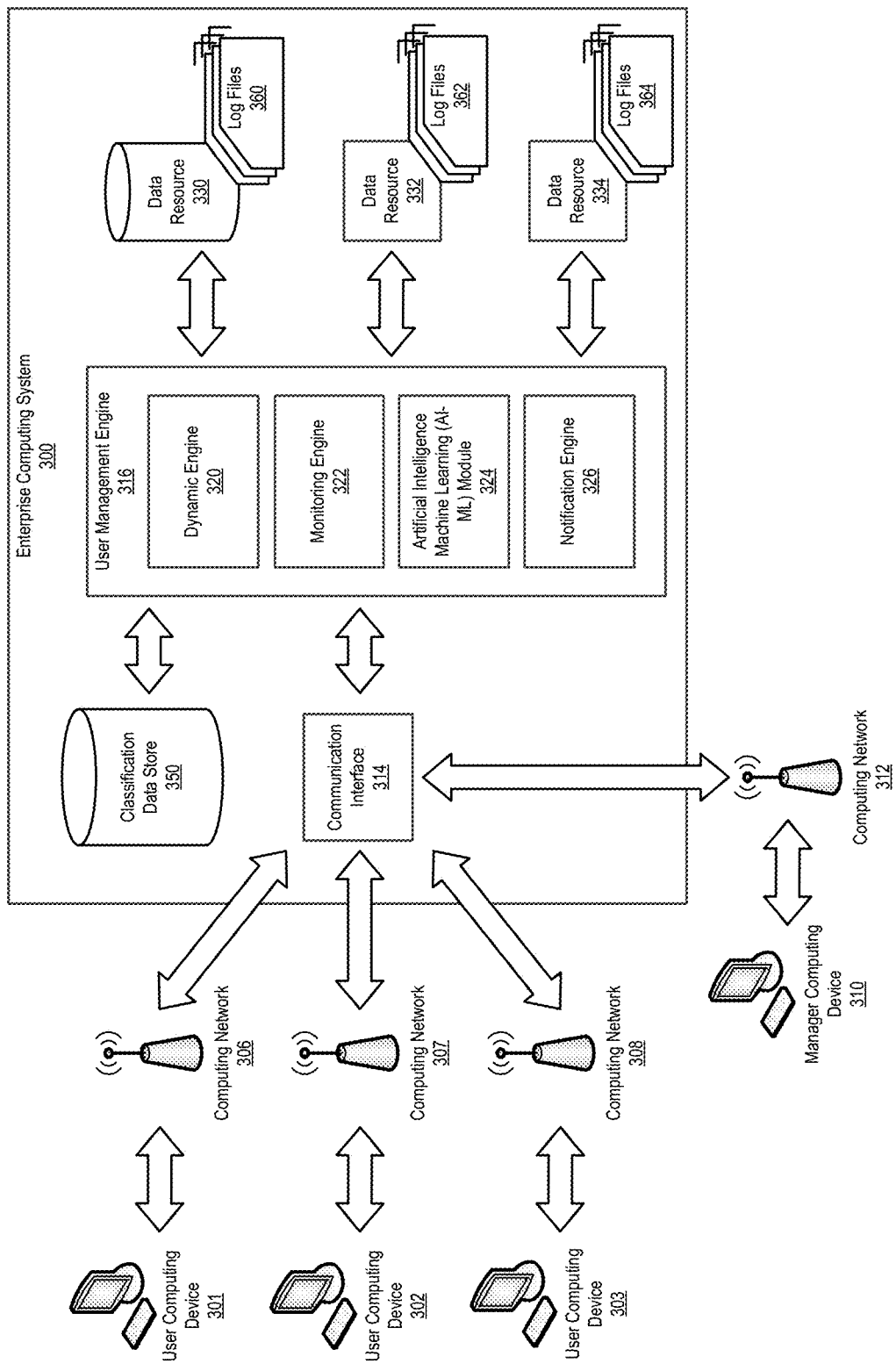
FIG. 3 depicts an illustrative computing environment for a dynamic user access management system in accordance with one or more aspects described herein.

FIG. 3 depicts an illustrative computing environment for a dynamic user access management system in accordance with one or more aspects described herein. For example, one or more user computing devices, each associated with a user, may operate within the system. User computing devices, including user computing device 301, user computing device 302, and user computing device 303 may each connect to separate or the same computing network(s) to access data resources. Data resources, including data resource 330, data resource 332, and data resource 334 may comprise a file, group of files, folder, server, data store, application, and/or any other form of data. For example, in FIG. 3, user computing device 301 connects to computing network 306, user computing device 302 connects to computing network 307, and user computing device 303 connects to computing network 308. The one or more computing networks may be a wired or wireless in nature. To access a data resource within the enterprise computing system 300, a user computing device may connect to a computing network. User computing devices (e.g. 301, 302, and/or 303) may access data resources via computing networks (e.g. 306, 307, and/or 308) by communicating with a communication interface 314. The communication interface 314 may control communications between computing devices outside the enterprise computing system 300 and the enterprise computing system 300.

A user management engine 316 may control access to data resources within the enterprise computing system. The user management engine 316 may comprise a dynamic engine 320, a monitoring engine 322, an artificial intelligence machine learning (AI-ML) module 324, and a notification engine 326. The elements of the user management engine 316 may be combined or altered and their functionality may be changed without departing from the present disclosure. Data available to any element within the user management engine 316 may be made available to any element within the user management engine 316. The dynamic engine 320 may execute access control functionality to data resources within the enterprise computing system 300. The monitoring engine 322 may monitor the user computing device and computing network used to attempt access to a data resource. The monitoring engine 322 may also monitor the log files of a data resource, the access inputs received from a computing device associated with a user's manager and/or administrator, and/or a user's leave status such as the user's availability status information stored in the user's calendar. The monitoring engine 322 may also monitor performance metrics of one or more system components, such as a server hardware performance information, application access information, network availability information and/or other information associated with a data resource. The AI-ML module 324 may analyze the data made available from other elements in the user management engine 316 and make automatic access determinations to data resources based on the available data, the knowledge base of the AI-ML module 324, machine learning and/or artificial intelligence algorithms (e.g., a linear regression algorithm, a logistic regression algorithm, a classification and regression tree algorithm, a naïve Bayes algorithm, an Apriori algorithm, a clustering algorithm, an artificial neural network and the like). The notification engine 326 may transmit notifications to user computing devices and manager computing devices outside of the enterprise computing system. The notifications may include information associated with access requests by a user, granted or denied access to a user and/or manager, proposed data access group information, and other information for any element within the enterprise computing system 300 and/or may solicit an input corresponding to the access requests. For example, if the AI-ML module 324 cannot make an access determination for a user computing device 302 attempting to access data resource 334, the notification engine 326 may transmit a notification to a manager computing device 310 by way of the communication interface 314 and computing network 312. This notification may contain information associated with the user, the user's access request, the requested data resource and/or may solicit an input associated with a manually determined access level for the user computing device 302 and/or the corresponding user. Simultaneously, the dynamic engine 320 may place a temporary hold on the access rights of the user to the data resource 334 the user was attempting to access.

The data resources may also contain associated log files that include information about the user computing device that attempted to access the data resource, including the time, location, network, and/or type of device used to access the data resource. For example, data resource 330 may contain log files 360, data resource 332 may contain log files 362, and data resource 334 may contain log files 364. The log files may also include performance metrics for the storage apparatus on which the data resource is stored, including CPU usage, RAM usage, processing times, and the like. The log files may store information corresponding to historical access of the data resource by one or more different users, including the user identification information, computing device information, the network information that may include information corresponding to a network type used to access the data resource, access time information, accessed and/or requested data information, computing device location information, communication session duration information, and/or the like. For example, the user computing device 301 may attempt to access data resource 330 within the enterprise computing system 300. Accordingly, the log files 360 may record the user computing device's 301 access request to the data resource 330. The monitoring engine 322 may monitor the data resources and associated log files for a data access request by a user computing device. Upon reception of a data access request by the user management engine 316, if there does not exist an access determination for a user computing device, the dynamic engine 320 may fetch the corresponding user classification for the user computing device and the data classification for the data resource from a classification data store 350. The AI-ML module 324 may analyze both classifications in determining access for the user computing device to the data resource. In some cases, if the knowledge base of the AI-ML module 324 cannot effectively use the available data and information to determine an access level for the user computing device and corresponding user, the AI-ML module 324 may direct the notification engine 326 to transmit a notification to a manager computing device 310, by way of the communication interface 314 of the enterprise computing system 300 and computing network 312. This notification may instruct the manager to manually grant or deny access to the data resource for the user computing device. Additionally, once a notification is transmitted to a manager computing device 310, a temporary hold may be placed on the data access rights of a user and user computing device until an access determination is made. Upon reception of a command to grant or deny access to the data resource, the dynamic engine 320 may execute the command to grant or deny access and may direct the notification engine 326 to transmit a notification to the user computing device 302 containing information regarding the access determination.

Figure 4A:
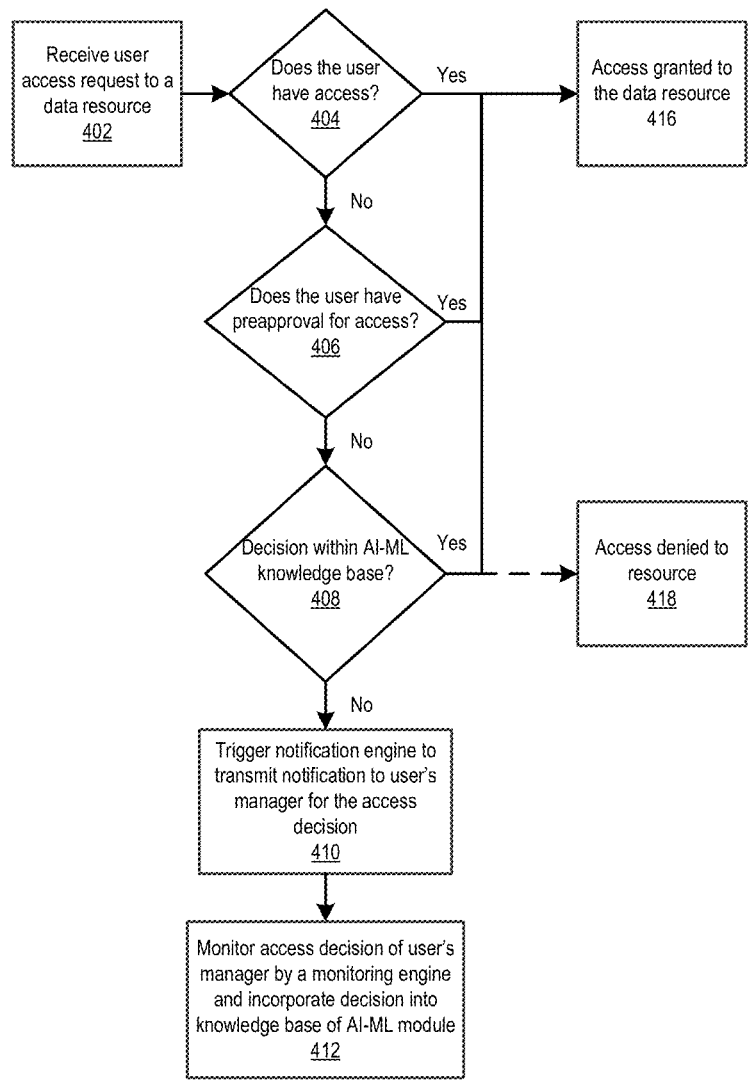
FIG. 4A depicts an illustrative event sequence for determining access to a data resource for a user in accordance with one or more aspects described herein.

FIG. 4A depicts an illustrative event sequence for determining access to a data resource for a user in accordance with one or more aspects described herein. The events shown in the illustrative event sequence are merely one illustrative sequence and additional events may be added, or events may be omitted, without departing from the disclosure. Inputs and outputs represented illustrative sequence may be associated with sources and destinations not depicted in the figures. At 402, a user data access request to a data resource may be received. At 404, it is determined if the user currently has access to the data resource. If the user has access, access may be granted to the data resource at 416. If the user does not have access, it is determined if the user's manager and/or administrator has designated the user for preapproval to access the data resource at 406. If the user does have preapproval from a manager and/or administrator to access the data resource, access may be granted at 416. If the user does not have preapproval from a manager to access the data resource, it is determined if the decision to grant or deny access to the data resource for the user is within the knowledge base of the AI-ML module 324 at 408. The AI-ML module 324 may analyze data regarding the user classification of the user attempting to access the data resource as well as the data classification of the data resource attempting to be accessed by the user. The AI-ML module 324 may also access data regarding a user's current and previous employment position. For example, a migrated user or group of users who moved from one employment position to another employment position may have a requirement for access to certain data resources and may no longer require access to other data resources. The AI-ML module may analyze a migrated user or group of users and automatically grant, deny, and/or revoke access to data resources based on analysis of the requirements of the employment position at 408. If the decision to grant or deny access to the user is within the knowledge base of the AI-ML module 324, the AI-ML module 324 may automatically grant access to the data resource at 416. In some cases, the AI-ML module 324 may automatically deny access to the data resource at 418. If the decision to grant or deny access to the user is not within the knowledge base of the AI-ML module 324, the AI-ML module 324 may trigger a notification engine 326 to transmit a notification to the user's manager to manually select an access level for a user 410. The AI-ML module 324 and dynamic engine 320 may place a temporary access hold on the user attempting to access a data resource. This temporary access hold may be for the specific data resource the user was attempting to access and/or all data access for the user. While the temporary access hold for the data resource is in place, a notification engine 326 may notify the manager and/or administrator of the user to manually determine an access level. The manager and/or administrator may communicate an input to override the access determination of the AI-ML module 324 to grant or deny access to the user. A monitoring engine 322 may monitor the access determination by the manager and/or administrator and automatically incorporate the access determination and related information into the knowledge base of the AI-ML module 324 for future automatic access determinations 412. The related information may include any combination of contextual information for the decision including the user device, computing network, server performance data metrics, current user access rights, and/or access groups of which the user is a member.

FIG. 4B shows an illustrative decision scenario table where access to data resources is determined for users in accordance with one or more aspects described herein. Table 430 depicts an example chart containing the user ID, corresponding risk score belonging to a user as part of the user classification, corresponding data set type belonging to a data classification for the data that the user is attempting to access, the resulting access determination by the dynamic engine 320, and the access determination by the user's manager if applicable. For example, the chart depicts that user ID UID 3 was assigned a risk score of 3 and attempted to access a data resource with a Secure data type. The access determination of Referred to Manager communicates that the AI-ML module 324 and dynamic engine 320 did not have enough knowledge to make an access determination, so a notification was transmitted to the user's manager by the notification engine 326. Given the information, the manager selected Access Denied for the manager access determination.

Figure 5A:
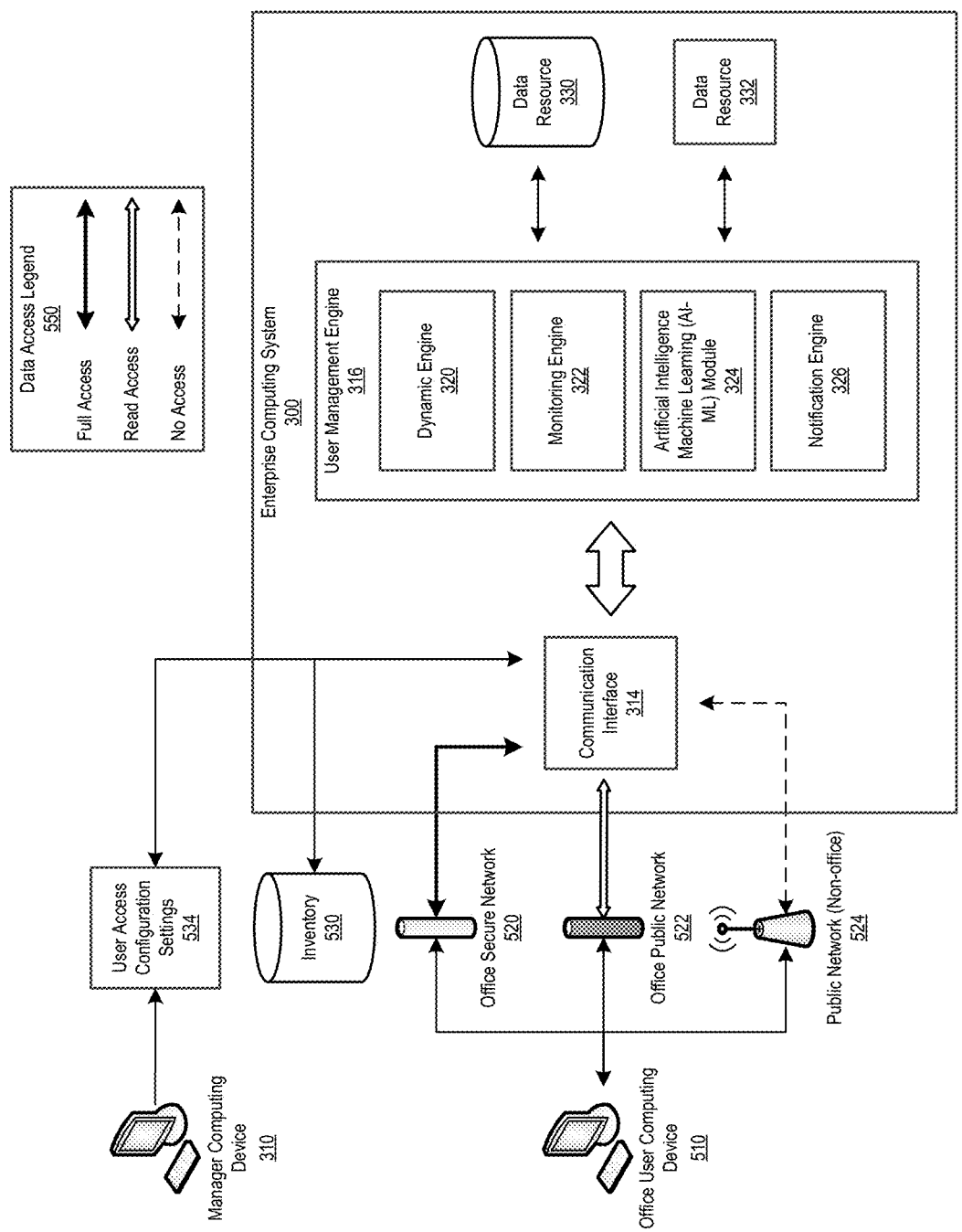
FIG. 5A depicts an illustrative computing environment where the environment determines the access a user has to a data resource in accordance with one or more aspects described herein.

FIG. 5A depicts an illustrative computing environment where the environment determines the access a user has to a data resource in accordance with one or more aspects described herein. In an attempt to access a data resource 330 and/or 332, a user may utilize an office user computing device 510. The office user computing device 510 may include mobile devices, tablets, laptop computers, and/or desktop computers. In order to access the data resource 330 and/or 332, an office user computing device 510 may require a computing network to connect to the enterprise computing system 300 and the data resource contained therein. The computing network may include an office secure network 520, an office public network 522, and a public network 524. In an attempt to access a data resource 330 and/or 332, the data access request from the office user computing device 510 transmitted over the computing network may be received by a user management engine 316 via a communication interface 314 within the enterprise computing system 300. The user management engine 316 may access information contained in a user access configuration settings profile 534 and an inventory data store 530 via the communication interface 314. The user access configuration settings profile 534 may contain user data access settings input by a user's manager and/or administrator utilizing a manager computing device 310. The data access settings may include options to preapprove a user's data access request from a computing device, network, or combination thereof. The inventory data store 530 may include information to identify computing devices and networks that are used to attempt to access a data resource 330 and/or 332. If a user operating an office user computing device 510 attempts to access a data resource 330 and/or 332, the user management engine 316 may receive the data access request via the communication interface 314 and determine access to the data resource 332 based on the computing device and the network used. For an office user computing device 510 and office secure network 520, the data access level granted by the user management engine 316 to the data resource 332 may be full access, as indicated by the data access legend 550. Full access to a data resource 332 may include read and write access. For an office user computing device 510 and office public network 522, the data access level granted by the user management engine 316 to the data resource 332 may be read access, as indicated by the data access legend 550. For an office user computing device 510 and public network 524, the data access level granted by the user management engine 316 to the data resource 332 may be no (denied) access, as indicated by the data access legend 550. The corresponding data access level granted by the user management engine 316 for the computing device and network used to access the data resource 332 may be overridden by user data access settings contained within the user access configuration settings profile 534 that is accessed by the user management engine 316 and the modules therein.

Figure 5B:
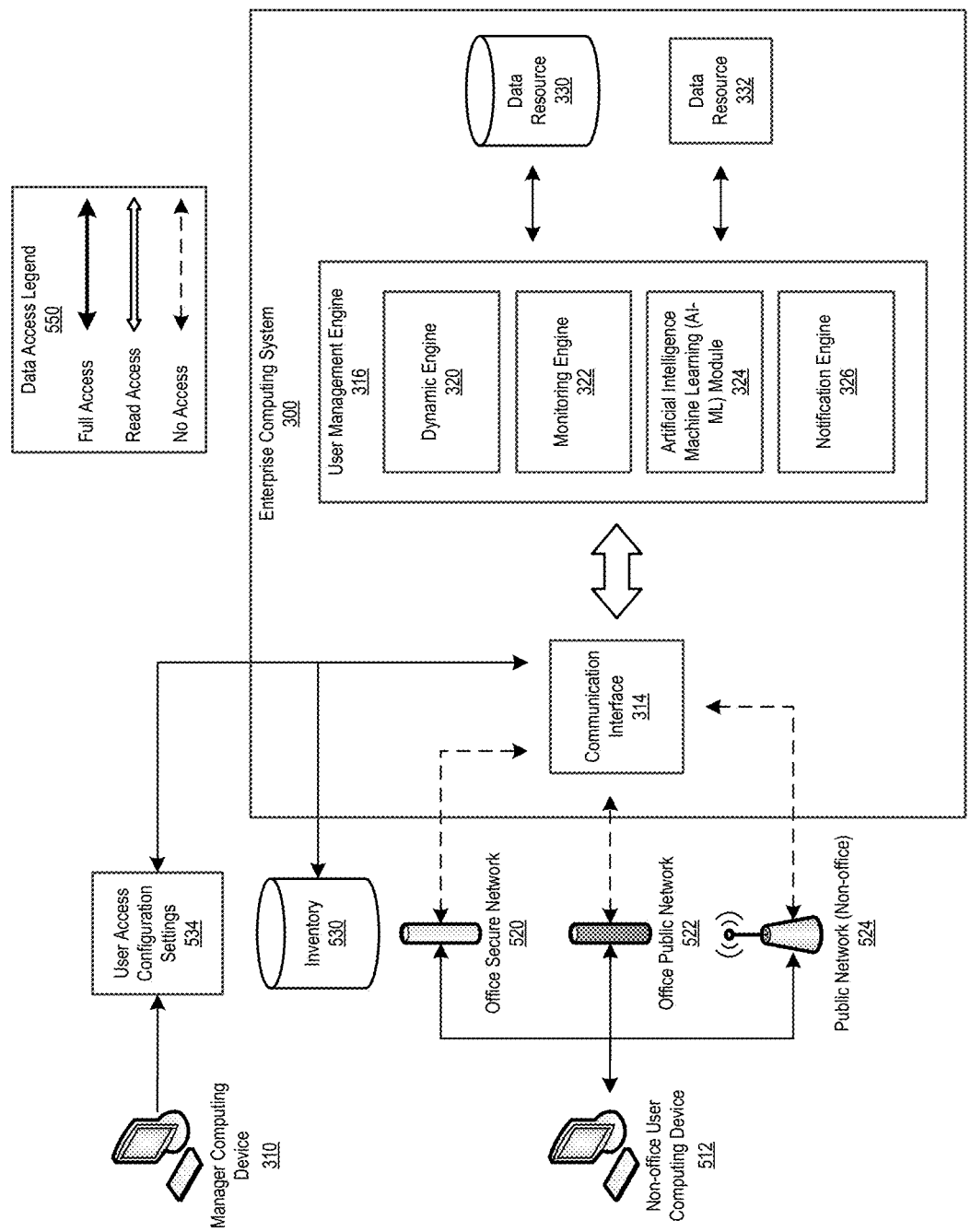
FIG. 5B depicts an illustrative computing environment where the environment determines the access a user has to a data resource in accordance with one or more aspects described herein

FIG. 5B depicts an illustrative computing environment where the environment determines the access a user has to a data resource in accordance with one or more aspects described herein. In an attempt to access a data resource 330 and/or 332, a user may utilize an office user computing device 510. The non-office user computing device 512 may include mobile devices, tablets, laptop computers, and/or desktop computers. To access the data resource 330 and/or 332, a non-office user computing device 512 may use one or more computing networks to connect to the enterprise computing system 300 and the data resource contained therein. The computing network may include an office secure network 520, an office public network 522, and a public network 524. In an attempt to access a data resource 330 and/or 332, the data access request from the non-office user computing device 512 transmitted over the computing network may be received by a user management engine 316 via a communication interface 314 within the enterprise computing system 300. The user management engine 316 may access information contained in a user access configuration settings profile 534 and an inventory data store 530 via the communication interface 314. The user access configuration settings profile 534 may contain user data access settings input by a user's manager and/or administrator utilizing a manager computing device 310. The data access settings may include options to preapprove a user's data access request from a computing device, network, or combination thereof. The inventory data store 530 may include information to identify computing devices and networks that are used to attempt to access a data resource 330 and/or 332.

If a user operating a non-office user computing device 512 attempts to access a data resource 330 and/or 332, the user management engine 316 may receive the data access request via the communication interface 314. The user management engine 316 may determine the user's access level to the data resource 332 based on the computing device and the network used. For a non-office user computing device 512 communicating via an office secure network 520, the data access level granted by the user management engine 316 to the data resource 332 may be no (denied) access, as indicated by the data access legend 550. For a non-office user computing device 512 communicating via an office public network 522, the data access level granted by the user management engine 316 to the data resource 332 may be no (denied) access, as indicated by the data access legend 550. For a non-office user computing device 512 communicating via a public network 524, the data access level granted by the user management engine 316 to the data resource 332 may be no (denied) access, as indicated by the data access legend 550. The corresponding data access level granted by the user management engine 316 for the computing device and network used to access the data resource 330 and/or 332 may be overridden by user data access settings contained within the user access configuration settings profile 534 that is accessed by the user management engine 316 and the modules therein.

Figure 6:
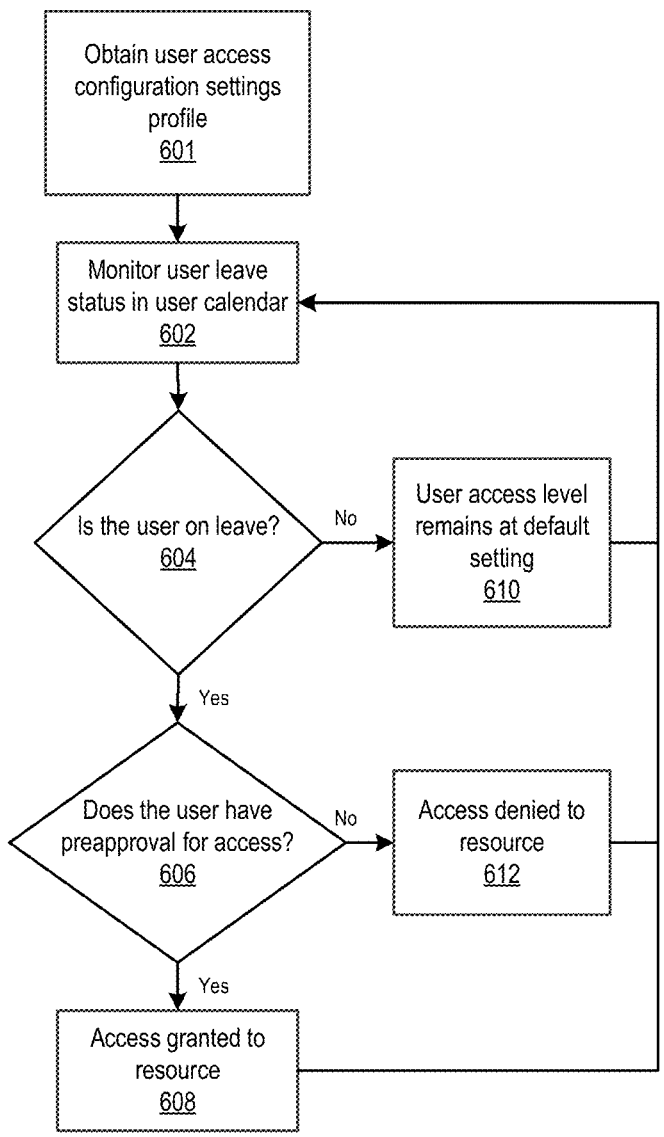
FIG. 6 depicts an illustrative event sequence for determining a user's access to a resource based on their availability in accordance with one or more aspects described herein.

FIG. 6 depicts an illustrative method for determining a user's access to a resource based on their availability in accordance with one or more aspects described herein. The illustrative method may begin by obtaining a user access settings configuration profile 601. A manager and/or administrator may enter user access configuration settings into a user access configuration settings profile via a user interface screen presented on a computing device. The user access configuration settings profile may contain preapproval access settings for a user that may allow the user to access a data resource outside of the user's default access determination and outside of the knowledge base of the AI-ML module 324. At 602, the user management engine may monitor a user's leave status by a monitoring engine 322. Based on the user leave status in a user's calendar in 602, the dynamic engine 320 may determine if the user who initiated the data access request is on any type of leave at 604. If the user is not on leave, the dynamic engine 320 may grant an access level consistent with the dynamic engine's knowledge base at 610. For example, if a user's calendar and the user leave status derived from the user's calendar information stored on the enterprise computing network indicates that the user is not on leave, and the user has access to the data resource, they will be granted access when they attempt to access the data resource, unless an alternate condition for access is not satisfied (e.g. the user attempts to access the data resource from a computing device and computing network that satisfies conditions to deny access to the data resource). If the user is on leave, at 606, the dynamic engine 320 may access data from the user access configuration settings profile to determine if the user has preapproval for access to a data resource while on leave. If the user does have preapproval for access, access is granted to the resource by the dynamic engine 320 at 608. If the user does not have preapproval for access, access to the data resource may be denied at 612. The illustrative event sequence may occur automatically upon an attempt to access a data resource by a user computing device and corresponding user. In some cases, the illustrative event sequence may also occur periodically (e.g. hourly, daily, and the like) and/or when the monitoring engine 322 detects a change in a user leave status to ensure that a proper access level is granted for a user.

Figure 7A:
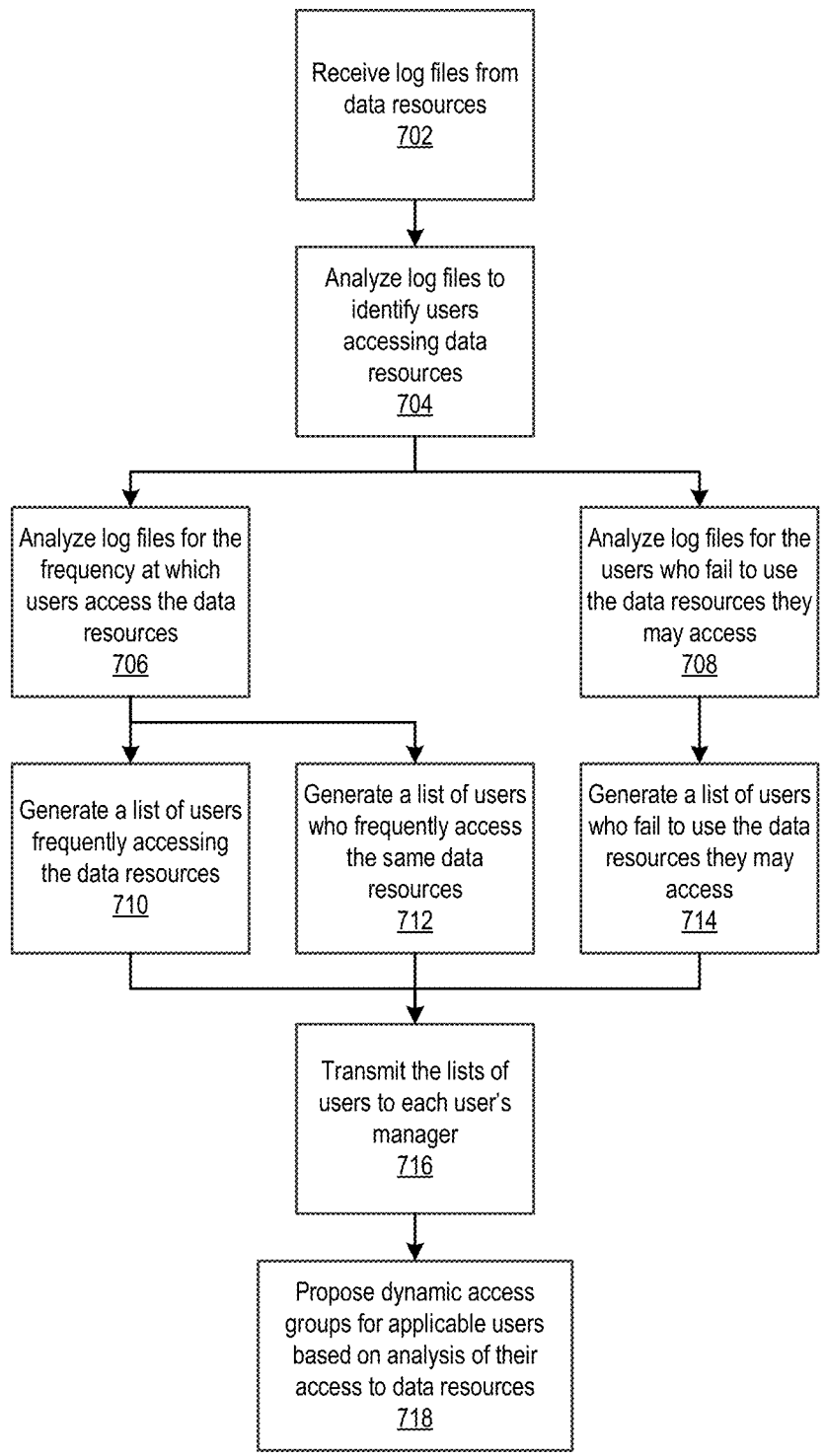
FIG. 7A depicts an illustrative event sequence for determining groups of common users in accordance with one or more aspects described herein.

FIG. 7A depicts an illustrative event sequence for determining groups of common users (e.g. blanket data access groups) in accordance with one or more aspects described herein. The illustrative event sequence may begin at 702 by receiving the log files of data resources. At 704, the log files may be analyzed to identify users who access the data resources. Based on the analysis, the user management engine 316 may then analyze log files to identify the frequency at which users access the data resources 706 and to identify the users who fail to access data files they may access 708. The user management engine 316 may generate a list of users frequently accessing the data resources at 710, a list of users who frequently access the same data resources may be generated at 712, and a list of users who fail to use the data resources they may access may be generated at 714. Upon generation of the lists of users, the lists may be transmitted by the user management engine 316 via a network to a computing device associated with each user's manager 716 to notify the managers of their user's data access habits. Dynamic blanket data access groups based on the users' monitored data access patterns and behaviors may be automatically proposed to managers and/or administrators at 718. Based on the dynamic blanket data access groups, the manager and/or administrator may enable data access according to the automatically generated blanket data access groups.

FIG. 7B shows illustrative tables for determining groups of common users in accordance with one or more aspects described herein. Table 740 depicts an illustrative chart detailing the configuration of a data access group. Table 740 specifically details a group, the resource type that the group may access, and the name of the data resource the group may access. For example, group GP 1 has access to a Server with the data resource name Resource1234. Table 742 depicts an illustrative user configuration table detailing a user ID and the corresponding group name of which the user is a member. Table 744 depicts an example of log entries from the log files of a data resource, including the date of the log entry, the user ID of the user who accessed the data resource, and the name of the data resource. For example, table 744 details that on date Feb. 21, 2018, user UID 3 accessed the data resource with the name \\_nnnn_\Folder1. Based on the log entries and existing user and group configurations, the dynamic engine 320 may suggest new data access groups. Table 746 depicts an example of a user ID, the user's current data access group, and a proposed data access group based on the log entries. As an example, proposal of data access groups, table 740 shows that GP 1 includes access to Resource1234, Resource4321, and \\_nnnn_\Folder1, while GP 2 includes access to only Resource1234 and \\_nnnn_\\Folder1. Users with the user ID UID 2 and UID 3 were originally members of group GP 2 according to table 742. Based on the log entries of table 744, UID 2 accesses Resource1234, Resource4321, and \\_nnnn_\\Folder1, while UID 3 accesses Resource4321 and \\_nnnn_\\Folder1. Based on these log entries, the user management engine proposes a new group for UID 2 as GP 1 and a new group for UID as a new group GP 3, comprising access to the data resources Resource4321 and \\_nnnn_\Folder1.

Figure 8A:
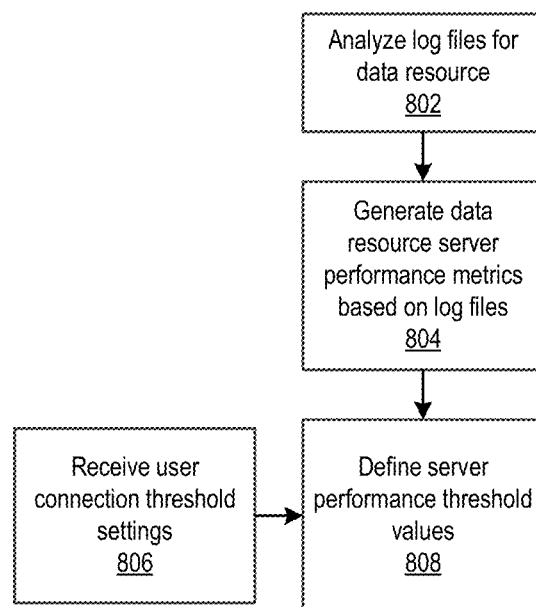
FIG. 8A depicts an illustrative event sequence for defining server performance threshold values in accordance with one or more aspects described herein.

FIG. 8A depicts an illustrative event sequence for defining server performance threshold values for a data store containing a data resource. The illustrative even sequence may begin with analysis of the log files in the data store containing a data resource 802. Analysis of the log files may include analyzing metrics like the times the data resource is accessed, the CPU and RAM usage while the data resource is accessed, and user data access patterns. The sequence may proceed with the generation of data resource server performance data metrics based on the contents of the log files 804. Before 808, user connection threshold settings, defined by a user manager and/or administrator, are received 806. The user connection threshold settings may include a numerical value for which if the number of users actively accessing the data resource exceed the user connection threshold, the user management engine may revoke access and terminate the connection of users to the data resource. The user management engine may also deny access to users who attempt to access the data resource when the user connection threshold is exceeded. Both the user connection threshold settings and data resource server performance data metrics are combined in 808 to define server performance threshold values. The server performance thresholds may include CPU usage, RAM usage, processing times, and/or a critical time for the data store for specific operating circumstances. The critical time may be a specific time or range of time in which the number of user connections and data access level for users may be further limited. During the critical time, user access to the data resource may automatically terminate. In some cases, the user management engine may determine server performance thresholds for the data store containing a data resource.

Figure 8B:
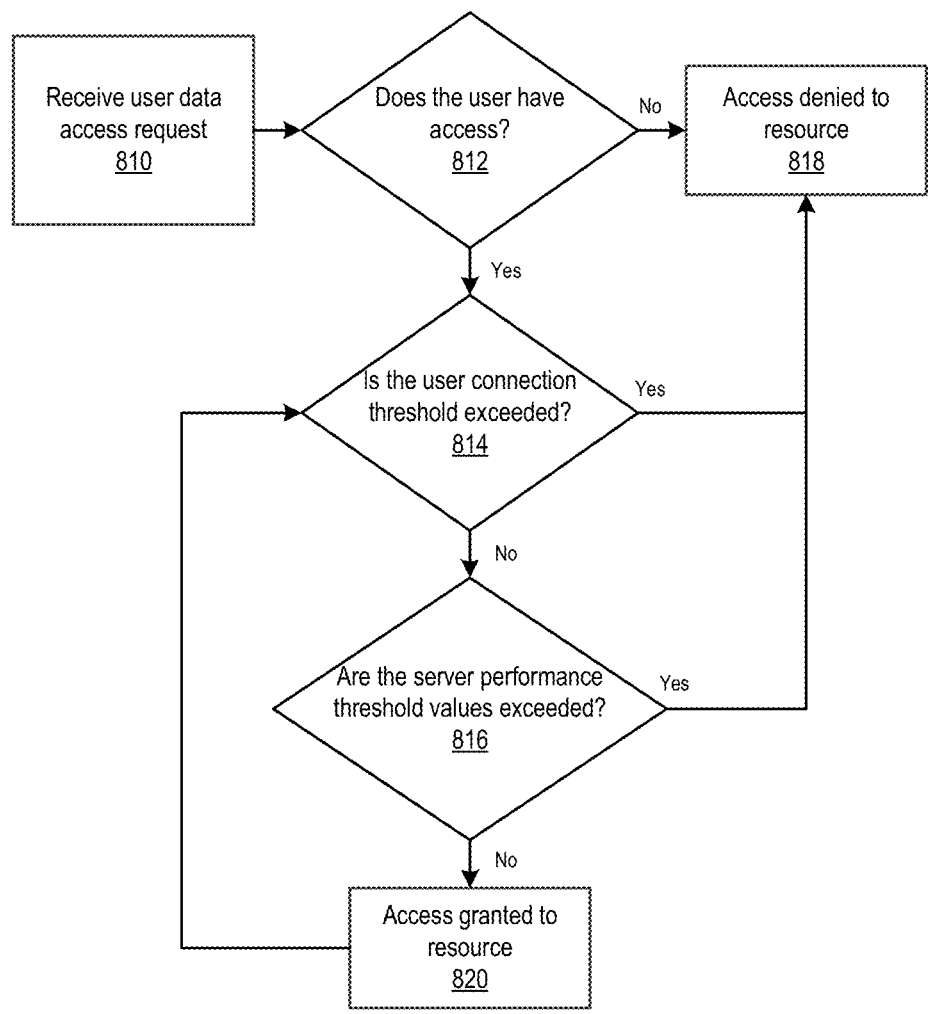
FIG. 8B depicts an illustrative event sequence for determining a user's access to a data resource based on the performance of the system containing the data resource in accordance with one or more aspects described herein.

FIG. 8B depicts an illustrative event sequence for determining a user's access to a data resource based on the performance of the system containing the data resource in accordance with one or more aspects described herein. The illustrative event sequence may begin with an administrator entering user connection threshold settings for a particular data store or server that is to be accessed. The illustrative event sequence may begin with reception of a user data access request 810. At 812, the verification of the user having existing access to the data resource is performed. If the user does not have access, access may be denied to the data resource at 818. If the user does have access to the resource, verification that the user connection threshold is not exceeded and will not be exceeded by allowing the user to access the data resource proceeds at 814. If the user connection threshold is already exceeded and/or allowing the user to access the resource would cause the user connection threshold to be exceeded, access to the resource may be denied at 818. If the user connection threshold is not already exceeded and allowing the user to access the resource would not cause the user connection threshold to be exceeded, verification that the server performance thresholds are not exceeded occurs at 816. If the server performance thresholds are not exceeded, the user management engine may grant access to data resource at 820. If the server performance thresholds are exceeded, the user management engine may deny access to the data resource at 818.

Figure 8C:
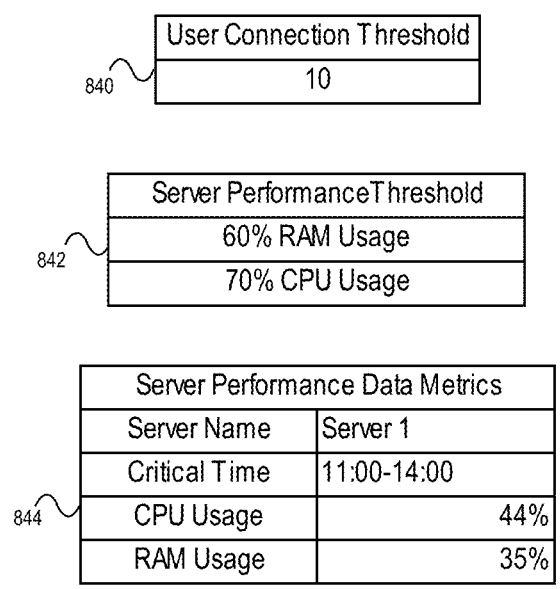
FIG. 8C shows illustrative tables for determining a user's access to a data resource based on the performance of the system containing the data resource in accordance with one or more aspects described herein.

FIG. 8C. shows illustrative tables for determining a user's access to a data resource based on the performance of the system containing the data resource in accordance with one or more aspects described herein. Table 840 depicts a defined user connection threshold for a particular data resource. Table 842 depicts server performance thresholds determined by the user management engine. In the case of table 842, the server performance thresholds are for RAM usage and CPU usage. If the RAM usage and/or CPU usage values exceed the values listed in table 842, or the time of access is within the critical time range, the dynamic engine 320 may deny access to those who attempt to access the data resource. Table 844 shows a server performance metrics for a data store containing a data resource, including but not limited to the server name, critical time for the server, CPU usage, and RAM usage. In the case of table 844, with a CPU usage of 44 percent and RAM usage of 35 percent, assuming the server is not in its critical time range, the access to the server and the data resources within the server would remain normal.

Figure 9:
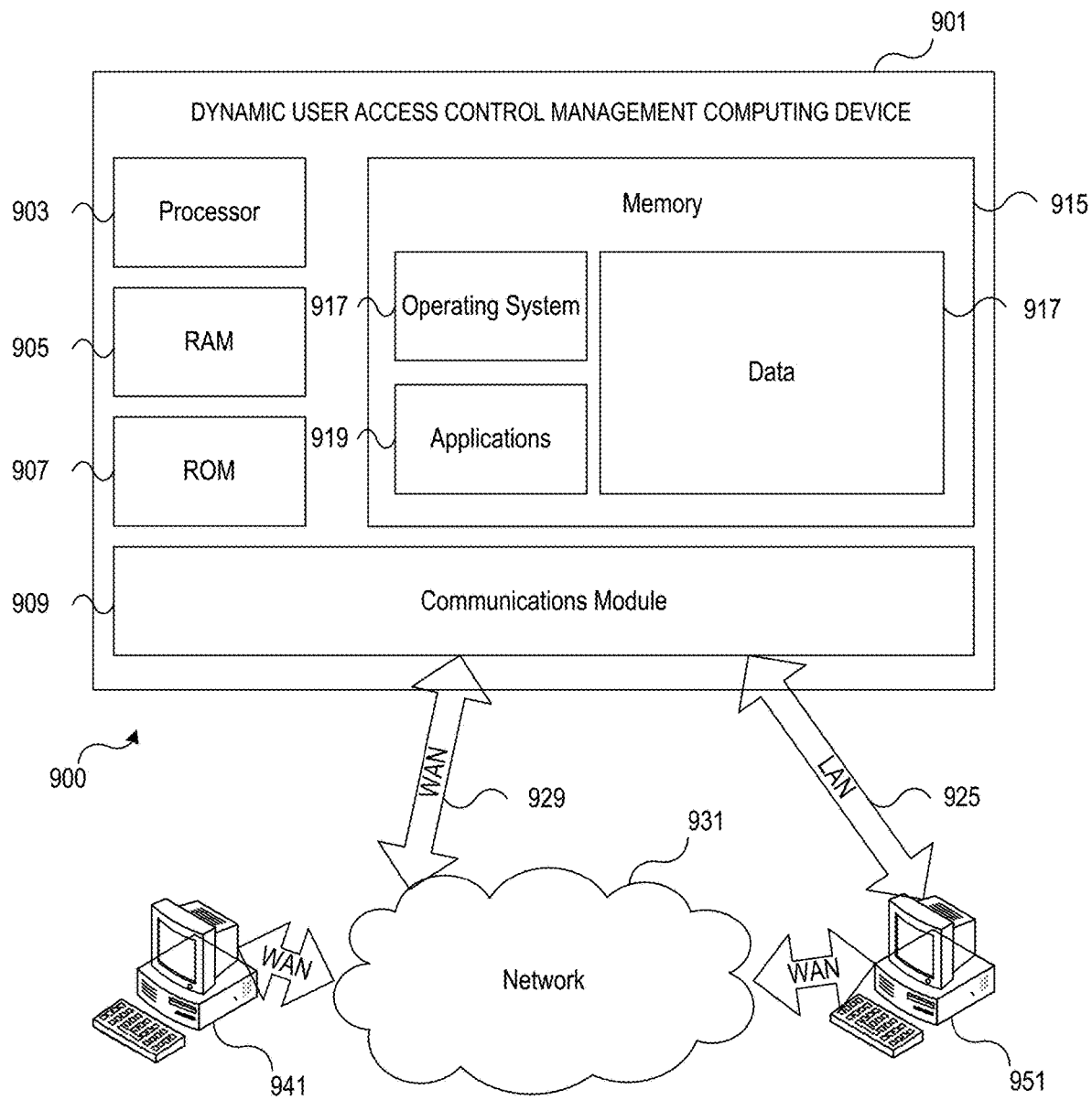
FIG. 9 shows an illustrative operation complexity graph operating environment in which various aspects of the disclosure may be implemented in accordance with one or more aspects described herein.

FIG. 9 shows an illustrative operating environment in which various aspects of the present disclosure may be implemented in accordance with one or more example embodiments. Referring to FIG. 9, a computing system environment 900 may be used according to one or more illustrative embodiments. The computing system environment 900 is only one example of a suitable computing environment and is not intended to suggest any limitation as to the scope of use or functionality contained in the disclosure. The computing system environment 900 should not be interpreted as having any dependency or requirement relating to any one or combination of components shown in the illustrative computing system environment 900.

The computing system environment 900 may include an illustrative dynamic user access control management computing device 901 having a processor 903 for controlling overall operation of the dynamic user access control management computing device 901 and its associated components, including a Random Access Memory (RAM) 905, a Read-Only Memory (ROM) 907, a communications module 909, and a memory 915. The dynamic user access control management computing device 901 may include a variety of computer readable media. Computer readable media may be any available media that may be accessed by the dynamic user access control management computing device 901, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the dynamic user access control management computing device 901.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 903 of the dynamic user access control management computing device 901. Such a processor may execute computer-executable instructions stored on a computer-readable medium.

Software may be stored within the memory 915 and/or other digital storage to provide instructions to the processor 903 for enabling the dynamic user access control management computing device 901 to perform various functions as discussed herein. For example, the memory 915 may store software used by the dynamic user access control management computing device 901, such as an operating system 917, one or more application programs 919, and/or an associated database 921. In addition, some or all of the computer executable instructions for the dynamic user access control management computing device 901 may be embodied in hardware or firmware. Although not shown, the RAM 905 may include one or more applications representing the application data stored in the RAM 905 while the dynamic user access control management computing device 901 is on and corresponding software applications (e.g., software tasks) are running on the dynamic user access control management computing device 901.

The communications module 909 may include a microphone, a keypad, a touch screen, and/or a stylus through which a user of the dynamic user access control management computing device 901 may provide input, and may include one or more of a speaker for providing audio output and a video display device for providing textual, audiovisual and/or graphical output. The computing system environment 900 may also include optical scanners (not shown).

The dynamic user access control management computing device 901 may operate in a networked environment supporting connections to one or more remote computing devices, such as the computing devices 941 and 951. The computing devices 941 and 951 may be personal computing devices or servers that include any or all of the elements described above relative to the dynamic user access control management computing device 901.

The network connections depicted in FIG. 9 may include a Local Area Network (LAN) 925 and/or a Wide Area Network (WAN) 929, as well as other networks. When used in a LAN networking environment, the dynamic user access control management computing device 901 may be connected to the LAN 925 through a network interface or adapter in the communications module 909. When used in a WAN networking environment, the dynamic user access control management computing device 901 may include a modem in the communications module 909 or other means for establishing communications over the WAN 929, such as a network 931 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 10:
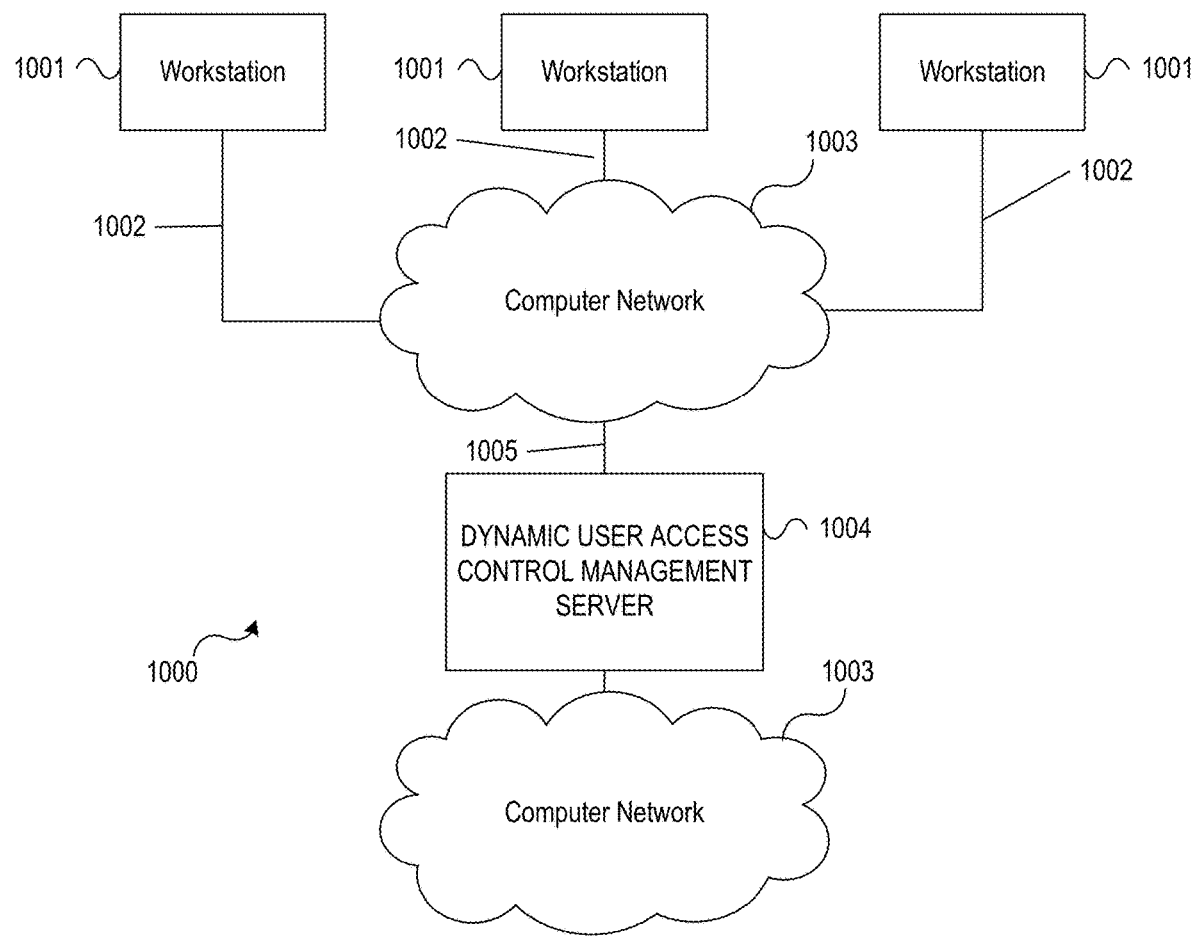
FIG. 10 shows an illustrative block diagram of workstations and servers that may be used to implement the processes and functions of certain aspects of the present disclosure in accordance with one or more aspects described herein.

FIG. 10 shows an illustrative block diagram of workstations and servers that may be used to implement the processes and functions of certain aspects of the present disclosure in accordance with one or more example embodiments. For example, an illustrative system 1000 may be used for implementing illustrative embodiments according to the present disclosure. As illustrated, the system 1000 may include one or more workstation computers 1001. The workstations 1001 may be, for example, a desktop computer, a smartphone, a wireless device, a tablet computer, a laptop computer, and the like, configured to perform various processes described herein. The workstations 1001 may be local or remote, and may be connected by one of the communications links 1002 to a computer network 1003 that is linked via the communications link 1005 to the dynamic user access control management server 1004. In the system 1000, the dynamic user access control management server 1004 may be a server, processor, computer, or data processing device, or combination of the same, configured to perform the functions and/or processes described herein. The dynamic user access control management server 1004 may be used to receive check images and associated data and/or validation scores, retrieve user profile, evaluate the check image compared to the user profile, identify matching or non-matching elements, generate user interfaces, and the like.

The computer network 1003 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 1002 and 1005 may be communications links suitable for communicating between the workstations 1001 and the dynamic user access control management server 1004, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in some embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A system comprising:
a computing device;
a data resource computing device; and
a computing platform, comprising:
  a processor;
  a communication interface communicatively coupled to the processor; and
  memory storing computer-readable instructions that, when executed by the processor, cause the computing platform to:
    monitor, by a user management engine, messages sent via a network from a plurality of computing devices comprising the computing device, wherein at least one message requests access to the data resource computing device;

determine, by the user management engine and based on the monitored messages, a plurality of communications metrics comprising a data access metric, an access frequency metric, and a connection history metric;

analyze, by the user management engine and based on log files associated with the data resource computing device, server performance data;

determine, by a machine learning module, a user access level to the data resource;

generate, by the machine learning module, dynamic user access rights for each of the plurality of computing devices; and send, by the user management engine and to the data resource computing device, a data access request message via a network based on the user access level.

2. The system of claim 1, wherein the instructions further cause the computing platform to:

determine, by the user management engine, a data resource classification based on historical user access information and a predefined weight metric.

3. The system of claim 1, wherein the instructions, when executed by the processor, cause the computing platform to:

determine, by the user management engine, a user access classification based on a number of data violations associated with a user and logged by an enterprise computing system.

4. The system of claim 1, wherein the instructions, when executed by the processor, cause the computing platform to monitor, by the user management engine, a plurality of messages received via the network from a plurality of user devices.

5. The system of claim 1, wherein the user access level is determined from at least two of historical user access information, data resource classification information, device communication information, server performance data, resource usage information, a manager approval input, a user's employment history information, and user leave status information.

6. The system of claim 5, wherein the user leave status information comprises one or more of a user's planned leave, unplanned leave, paid leave, unpaid leave, vacation, suspension, and termination information.

7. The system of claim 1, wherein the user access level comprises one of full access to the data resource, read access to the data resource, and no access to the data resource.

8. A method, comprising:

monitoring, by a user management engine, a plurality of messages received via a network from a plurality of computing devices, wherein at least one message of the plurality of messages comprises a request to access a data resource;

determining, by the user management engine and based on the monitored plurality of messages, a plurality of communications metrics comprising a data access metric, an access frequency metric, and a connection history metric;

analyzing, by the user management engine and based on log files associated with the data resource, server performance data;

determining, by a machine learning module, a user access level to the data resource;

generating, by the machine learning module, dynamic user access rights for each of the plurality of computing devices; and sending, by the user management engine, a data access request message via a network based on the user access level.

9. The method of claim 8, comprising:

determining, by the user management engine, a data resource classification based on historical user access information and a predefined weight metric.

10. The method of claim 8, comprising:

determining, by the user management engine, a user access classification based on a number of data violations associated with a user and logged by an enterprise computing system.

11. The method of claim 8, comprising:

monitoring, by the user management engine, a second plurality of messages received via the network from a plurality of user devices.

12. The method of claim 8, wherein the user access level is determined from at least two of historical user access information, data resource classification information, device communication information, server performance data, resource usage information, a manager approval input, a user's employment history information, and user leave status information.

13. The method of claim 12, wherein the user leave status information comprises one or more of a user's planned leave, unplanned leave, paid leave, unpaid leave, vacation, suspension, and termination information.

14. The method of claim 8, wherein the user access level comprises one of full access to the data resource, read access to the data resource, and no access to the data resource.

15. One or more non-transitory computer-readable media storing instructions that, when executed by a computing platform comprising at least one processor, memory, and a communication interface, cause the computing platform to:

monitor, by a user management engine, messages sent via a network from a plurality of computing devices, wherein at least one message comprises a request to access a data resource;

determine, by the user management engine and based on the monitored messages, a plurality of communications metrics comprising a data access metric, an access frequency metric, and a connection history metric;

analyze, by the user management engine and based on log files associated with the data resource, server performance data;

generate, by a machine learning module, dynamic user access rights for each of the plurality of computing devices; and send, by the user management engine, a data access request message via a network based on a user access level corresponding to the dynamic user access rights.

16. The one or more non-transitory computer-readable media of claim 15, wherein the instructions further cause the computing platform to:

determine, by the user management engine, a data resource classification based on historical user access information and a predefined weight metric.

17. The one or more non-transitory computer-readable media of claim 15, wherein the instructions further cause the computing platform to:

determine, by the user management engine, a user access classification based on a number of data violations associated with a user and logged by an enterprise computing system.

18. The one or more non-transitory computer-readable media of claim 15, wherein the instructions further cause the computing platform to:
   monitor, by the user management engine, a second plurality of messages received via the network from a plurality of user devices.

19. The one or more non-transitory computer-readable media of claim 15, wherein the user access level is determined from at least two of historical user access information, data resource classification information, device communication information, server performance data, resource usage information, a manager approval input, a user's employment history information, and user leave status information.

20. The one or more non-transitory computer-readable media of claim 15, wherein a user leave status information comprises one or more of a user's planned leave, unplanned leave, paid leave, unpaid leave, vacation, suspension, and termination information.

* * * * *

UNITED STATES PATENT AND TRADEMARK OFFICE
CERTIFICATE OF CORRECTION

PATENT NO. : 11,777,949 B2  
APPLICATION NO. : 17/833161  
DATED : October 3, 2023  
INVENTOR(S) : Vegulla et al.

Page 1 of 1

It is certified that error appears in the above-identified patent and that said Letters Patent is hereby corrected as shown below:

On the Title Page

Column 2, Line 1:
Delete "3,578,492 A1" and insert --8,578,492 B2-- therefor

Signed and Sealed this
Fourth Day of February, 2025

Coke Morgan Stewart
*Acting Director of the United States Patent and Trademark Office*